United States Patent Office.

WILLIAM M. DU BOIS, OF POUGHKEEPSIE, NEW YORK.

Letters Patent No. 79,641, dated July 7, 1868.

IMPROVED CATHARTIC LOZENGE.

*The Schedule referred to in these Letters Patent and making part of the same.*

TO ALL WHOM IT MAY CONCERN:

Be it known that I, WILLIAM M. DU BOIS, of Poughkeepsie, in the county of Dutchess, and State of New York, have invented a new and improved Cathartic Lozenge; and I do hereby declare that the following is a full, clear, and exact description thereof, which will enable others skilled in the art to make and use the same.

This invention consists in the preparation of a medicinal bark, having cathartic properties in the convenient and palatable form of a lozenge, pill, or bolus, whereby the same is more easily and conveniently carried and administered.

The chief ingredient of my invention is the aqueous extract of the bark of the tree known as the *Ramnus frangula*, known in commerce as the *Cortex frangula*. The properties of this bark are gently but actively laxative, and, though but slightly known in the medical practice of the United States, it has received the professional endorsement of the faculty wherever it has become sufficiently known.

Heretofore this medicine was administered in the form of a decoction or tincture, and in this form was unpleasant, and less convenient than in the form resulting from my improved combination.

The lozenge is made by saturating gum-tragacanth with the strong aqueous extract of the *Cortex frangula* obtained by boiling the latter in about four times its bulk of water. The gum-tragacanth is brought to a thick, viscous consistence by the said aqueous extract, and sufficient sugar (white sugar is preferable) is added to and commingled with the aforesaid ingredients to bring the mass to an adherent plastic condition, suitable for cutting out into lozenges or rolling into pills or boluses. The lozenge-form is preferred as the most convenient.

Other gums used in pharmacy for combining medicinal ingredients, as gum-arabic and others, may be substituted for the gum-tragacanth, without impairing the efficiency of the compound.

The proportions of the ingredients may be varied within any reasonable limit from those above set forth, without materially impairing the efficiency of the compound.

The lozenges are flavored with essence of winter-green or any other palatable and harmless flavoring-extract or essence.

The manner of taking the above medicine is determined by the person using it, in a great degree, by taking from two to six lozenges, of the usual size of lozenges, per day, or one or two of such after each meal, so as to act mildly on the bowels once or twice a day, which dose is continued about two weeks, more or less, and then gradually decreased in quantity and frequency, finally leaving the bowels operating with the proper natural energy.

The principal ingredient of this compound acts upon the liver cathartically, though without any drastic, griping effect.

Having thus described my invention, what I claim as new, and desire to secure by Letters Patent, is—

The medicinal compound, composed of the ingredients in the manner and proportions herein described.

The above specification of my invention signed by me, this 23d day of April, 1868.

WILLIAM M. DU BOIS.

Witnesses:
WM. F. McNAMARA,
ALEX. F. ROBERTS.